United States Patent
Lohmann

(10) Patent No.: US 10,071,707 B2
(45) Date of Patent: Sep. 11, 2018

(54) ELIMINATION OF THE ACTIVATABILITY OF A FUNCTION BY A RADIO ON A VEHICLE

(71) Applicant: VOLKSWAGEN AG, Wolfsburg (DE)

(72) Inventor: Peter Lohmann, Rhede (DE)

(73) Assignee: VOLKSWAGEN AG (DE)

( * ) Notice: Subject to any disclaimer, the term of this patent is extended or adjusted under 35 U.S.C. 154(b) by 154 days.

(21) Appl. No.: 15/216,270

(22) Filed: Jul. 21, 2016

(65) Prior Publication Data
US 2017/0021803 A1    Jan. 26, 2017

(30) Foreign Application Priority Data

Jul. 23, 2015 (DE) .......................... 10 2015 213 934

(51) Int. Cl.
| | |
|---|---|
| *G06F 7/00* | (2006.01) |
| *B60R 25/20* | (2013.01) |
| *B60R 25/24* | (2013.01) |
| *B60R 25/01* | (2013.01) |
| *G07C 9/00* | (2006.01) |

(52) U.S. Cl.
CPC ............ *B60R 25/209* (2013.01); *B60R 25/01* (2013.01); *B60R 25/246* (2013.01); *G07C 9/00309* (2013.01); *G07C 9/00896* (2013.01); *B60R 2325/205* (2013.01); *G07C 2009/00769* (2013.01)

(58) Field of Classification Search
CPC ..... B60R 25/24; B60R 25/25; B60R 25/2018; B60R 25/102; B60R 25/252; G07C 9/00309; G07C 2009/00555; E05B 77/28
See application file for complete search history.

(56) References Cited

U.S. PATENT DOCUMENTS

| | | | | |
|---|---|---|---|---|
| 4,706,064 A * | 11/1987 | Hwang | ............... | B60R 25/1003 340/430 |
| 4,733,638 A * | 3/1988 | Anderson | ............... | B60R 25/04 123/198 B |
| 4,749,873 A * | 6/1988 | Mutoh | .................... | B60R 25/24 307/10.2 |
| 4,802,350 A * | 2/1989 | Periou | .................... | E05B 77/26 70/264 |
| 4,812,670 A * | 3/1989 | Goulet | .................. | B60R 25/045 180/283 |
| 4,980,666 A * | 12/1990 | Hwang | ............... | B60R 25/1003 307/10.2 |

(Continued)

FOREIGN PATENT DOCUMENTS

| | | | |
|---|---|---|---|
| DE | 102011116209 A1 * | 4/2012 | ............ B60R 25/24 |
| DE | 102011116209 A1 | 4/2012 | |

(Continued)

OTHER PUBLICATIONS

Telestart T91; Instructions; Oct. 2012.
Search Report for German Application No. 10 2015 213 934.4; dated Mar. 22, 2016.

*Primary Examiner* — Khoi H Tran
*Assistant Examiner* — Jorge O Peche
(74) *Attorney, Agent, or Firm* — Barnes & Thornburg LLP

(57) ABSTRACT

A method to activate a function of a vehicle including transmitting a wireless command from a portable apparatus to the vehicle and activating the function if a wireless activation facility of the function is not switched off.

19 Claims, 2 Drawing Sheets

(56) References Cited

U.S. PATENT DOCUMENTS

| | | | | |
|---|---|---|---|---|
| 5,006,843 A | * | 4/1991 | Hauer | B60R 25/04 180/167 |
| 5,401,133 A | * | 3/1995 | Kuchler | E04B 9/245 411/402 |
| 5,422,632 A | * | 6/1995 | Bucholtz | B60R 25/04 307/10.3 |
| 5,869,908 A | * | 2/1999 | Moczygemba | B60R 25/24 180/287 |
| 6,212,450 B1 | * | 4/2001 | Kokubu | G06K 19/0723 307/10.7 |
| 6,269,292 B1 | * | 7/2001 | Kokubu | G07C 5/0858 235/375 |
| 6,573,615 B1 | * | 6/2003 | Asakura | B60R 25/04 307/10.2 |
| 6,670,883 B1 | * | 12/2003 | Asakura | B60R 25/24 307/10.1 |
| 6,778,065 B1 | * | 8/2004 | Asakura | B60R 25/245 340/12.5 |
| 6,956,467 B1 | * | 10/2005 | Mercado, Jr. | B60R 25/042 340/425.5 |
| 9,365,188 B1 | * | 6/2016 | Penilla | B60R 25/2018 |
| 9,666,040 B2 | * | 5/2017 | Flaherty | G08B 6/00 |
| 9,754,431 B2 | * | 9/2017 | Sigal | G07C 9/00309 |
| 9,767,629 B1 | * | 9/2017 | Gulati | G07C 9/00007 |
| 9,878,691 B2 | * | 1/2018 | Morris | B60R 25/245 |
| 9,975,504 B2 | * | 5/2018 | Dalke | B60R 16/03 |
| 2001/0022549 A1 | * | 9/2001 | Mauel | E05B 77/26 340/5.72 |
| 2002/0025823 A1 | * | 2/2002 | Hara | B60R 25/24 455/456.5 |
| 2003/0020601 A1 | * | 1/2003 | Caren | B60R 25/24 340/425.5 |
| 2003/0046540 A1 | * | 3/2003 | Nakamura | B60R 25/25 713/168 |
| 2003/0047999 A1 | * | 3/2003 | Chang | B60R 25/04 307/10.3 |
| 2003/0231100 A1 | * | 12/2003 | Chung | B60R 25/021 340/5.2 |
| 2004/0251744 A1 | * | 12/2004 | Egawa | B60R 25/04 307/10.1 |
| 2005/0197174 A1 | | 9/2005 | Hasan et al. | |
| 2005/0235711 A1 | * | 10/2005 | Martin | E05B 65/08 70/100 |
| 2005/0258686 A1 | * | 11/2005 | Hiramitsu | B60R 25/045 307/10.1 |
| 2006/0076834 A1 | * | 4/2006 | Kamiya | B60R 25/02153 307/10.1 |
| 2006/0082435 A1 | * | 4/2006 | Matsumoto | B60R 25/04 340/5.23 |
| 2006/0164207 A1 | * | 7/2006 | Wilcox | B60R 25/24 340/5.61 |
| 2007/0247280 A1 | * | 10/2007 | Nakamura | B60R 25/24 340/5.72 |
| 2008/0055116 A1 | * | 3/2008 | Luo | G01C 21/20 340/988 |
| 2008/0061925 A1 | * | 3/2008 | Bergerhoff | B60R 25/24 340/5.6 |
| 2008/0074243 A1 | * | 3/2008 | Yoshitake | B60R 25/24 340/425.5 |
| 2009/0240845 A1 | * | 9/2009 | Wiegand | B60K 35/00 710/16 |
| 2010/0033342 A1 | * | 2/2010 | Patenaude | B60R 25/2018 340/8.1 |
| 2010/0235026 A1 | * | 9/2010 | Shimizu | B60R 25/241 701/22 |
| 2010/0315267 A1 | * | 12/2010 | Chung | B60R 25/24 341/22 |
| 2011/0172885 A1 | * | 7/2011 | Fawaz | G08C 17/02 701/48 |
| 2011/0257817 A1 | * | 10/2011 | Tieman | B60R 25/24 701/2 |
| 2012/0003992 A1 | * | 1/2012 | Staton | B60R 25/00 455/456.1 |
| 2012/0271487 A1 | * | 10/2012 | Lickfelt | B60R 25/00 701/2 |
| 2013/0107762 A1 | * | 5/2013 | Meier | H04W 80/00 370/277 |
| 2014/0055236 A1 | * | 2/2014 | Kuebler | G07C 9/00174 340/5.61 |
| 2014/0152422 A1 | * | 6/2014 | Breed | G06K 9/00369 340/5.52 |
| 2014/0303811 A1 | * | 10/2014 | Ledendecker | G07C 9/00944 701/2 |
| 2014/0343788 A1 | * | 11/2014 | Hosey | F02D 29/02 701/36 |
| 2015/0048927 A1 | * | 2/2015 | Simmons | G07C 9/00309 340/5.61 |
| 2015/0070135 A1 | * | 3/2015 | Ford | B60R 25/24 340/5.72 |
| 2015/0074805 A1 | * | 3/2015 | Choi | H04W 12/08 726/22 |
| 2015/0120085 A1 | * | 4/2015 | Sanji | B60R 25/24 701/1 |
| 2015/0126234 A1 | * | 5/2015 | Rodriguez | G08B 13/22 455/457 |
| 2015/0170505 A1 | * | 6/2015 | Frew | G08B 25/10 340/539.22 |
| 2015/0210249 A1 | * | 7/2015 | Morris | B60R 25/24 701/1 |
| 2015/0266451 A1 | * | 9/2015 | Oohara | B60R 25/24 701/2 |
| 2016/0049033 A1 | * | 2/2016 | Sigal | B60R 25/24 340/5.61 |
| 2016/0110988 A1 | * | 4/2016 | Nixon | B60R 25/24 340/539.32 |
| 2016/0306350 A1 | * | 10/2016 | Shim | G05D 1/0016 |
| 2017/0120864 A1 | * | 5/2017 | Fischer | B60K 35/00 |
| 2017/0136990 A1 | * | 5/2017 | Tercero | B60R 25/24 |
| 2018/0015905 A1 | * | 1/2018 | Yorke | B60R 25/24 |
| 2018/0037114 A1 | * | 2/2018 | Gurunathan | B60K 31/0058 |
| 2018/0089918 A1 | * | 3/2018 | Murray | G07C 9/00309 |
| 2018/0105137 A1 | * | 4/2018 | Kawamura | B60R 25/243 |

FOREIGN PATENT DOCUMENTS

| | | | | |
|---|---|---|---|---|
| EP | 0908589 A2 | | 4/1999 | |
| EP | 1808820 A1 | | 7/2007 | |
| EP | 3061658 A1 | | 8/2016 | |
| GB | 2426102 A | * | 11/2006 | B60R 25/24 |
| GB | 2426102 A | | 11/2006 | |
| JP | 2008088720 A | | 4/2008 | |

* cited by examiner

ELIMINATION OF THE ACTIVATABILITY OF A FUNCTION BY A RADIO ON A VEHICLE

PRIORITY CLAIM

This patent application claims priority to German Patent Application No. 10 2015 213 934.4, filed 23 Jul. 2015, the disclosure of which is incorporated herein by reference in its entirety.

SUMMARY

Illustrative embodiments relate to the switching off of the wireless activation facility of a function for a vehicle.

BRIEF DESCRIPTION OF THE DRAWINGS

The disclosed embodiments are explained in detail below with reference to the figures.

DETAILED DESCRIPTION OF THE DISCLOSED EMBODIMENTS

Figure 1:
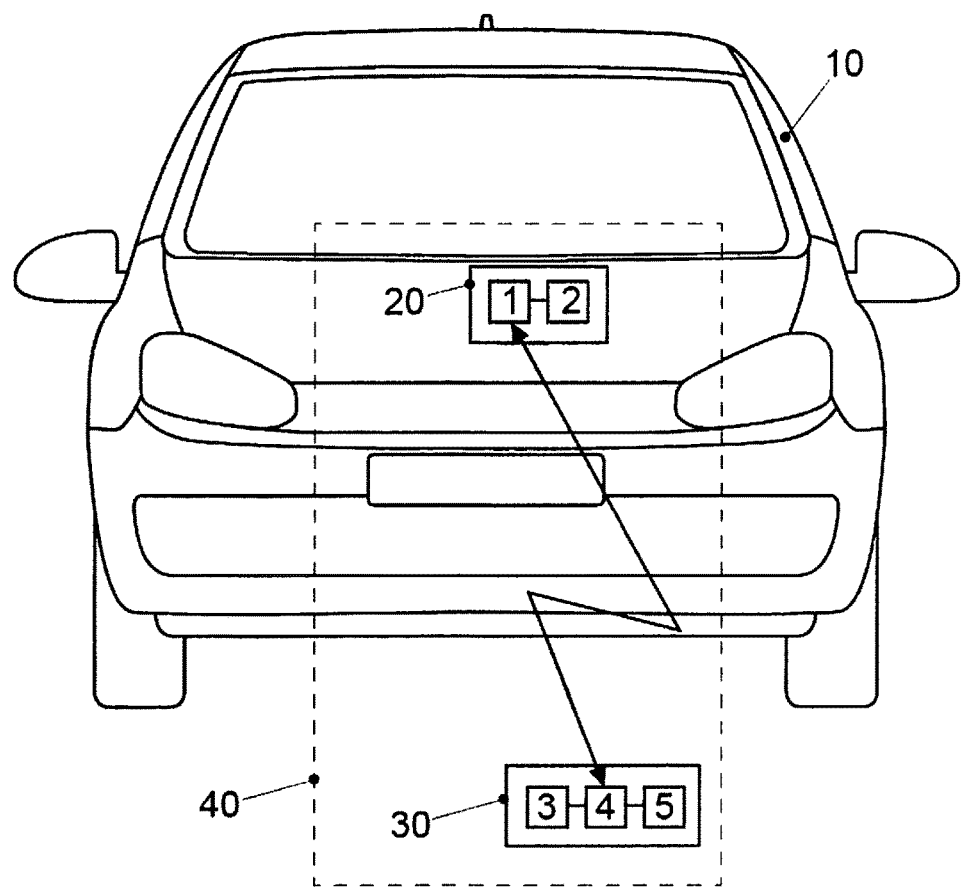
FIG. 1 shows schematically a disclosed system and a disclosed vehicle.

DE 102 33 597 A1 discloses an access system for a vehicle, wherein a warning signal is or can be output to a key if an object secured with this key is accessed.

According to the prior art, most vehicles can be operated remotely via a wireless remote control. However, this wireless operability has the disadvantage that an unauthorized party can operate the vehicle without being in possession of the authorized key. One example of someone operating a vehicle without being in possession of the authorized key is known as a relay attack or relay station attack, in which the short range of the authorized key is increased with relay stations to obtain access to the vehicle unnoticed by the owner of the authorized key.

Disclosed embodiments hinder unauthorized access by means of wireless commands to a vehicle.

Disclosed embodiments provide a method for activating a function of a vehicle by a vehicle and by a system.

Disclosed embodiments provide a method for activating a function of a vehicle, wherein the method comprises the following operations:

Transmitting a wireless command from a portable apparatus (e.g., a wireless key or Smartphone) to the vehicle. The function of the vehicle is intended to be activated by this wireless command.

Activating the function if the wireless activation facility of this function is not switched off. In other words, the wireless activation of the function (i.e., with a wireless command) can be permitted or not permitted. The function can be activated via the wireless command only if the wireless activation of the function is permitted (i.e., the wireless activation facility of the function is switched on). On receiving the wireless command to activate the function, a check is first carried out to determine whether the wireless activation facility of this function is switched on or switched off. The wireless command results in the activation of the function only if the wireless activation facility of the function is switched on or is not switched off.

By means of the disclosed method, the user of a vehicle can switch off the wireless activation of specific functions or all functions of the vehicle in certain situations (for example, in unfamiliar surroundings if the user estimates the risk of a theft of the vehicle as high), (i.e., the user deactivates the facility to activate the corresponding functions with a wireless command), so that the vehicle can then, for example, be operated only with a mechanical key (or so that the function of the vehicle can then, for example, be activated only with a mechanical key). If the wireless activation of a specific function is not possible, a relay attack to activate this function is similarly not possible.

The function or functions of which the wireless activation facility can be switched off may be entail the following functions:

Unlocking of a central lock of the vehicle.

Starting a drive motor of the vehicle.

It is obviously possible to switch off the wireless activation facility for every conceivable function of the vehicle.

The activation facility of the function(s) is switched off by a user.

The switching on and off of the activation facility of the function(s) can be carried out, for example, inside the vehicle, so that it is ensured that the activation facility can be used only by a person who has access to the vehicle. Other scenarios are, however, also conceivable for switching the activation facility of the function(s) on or off, as described below.

The wireless activation facility of the function can be switched off, for example, if a specific wireless command from the portable apparatus is received by the vehicle. In other words, it is no longer possible to activate the function wirelessly (i.e., with a wireless command assigned to the function) if the vehicle previously receives the specific wireless command to switch off the activation facility.

In this disclosed embodiment, the wireless activation facility of the function can be switched off via the wireless remote control (e.g., a wireless key or Smartphone) itself.

A further possibility consists in switching off the wireless activation facility of the function if the portable apparatus is no longer located within the wireless reception range of the vehicle. In this disclosed embodiment, the vehicle is switched to a type of preliminary switch-off mode. As long as the vehicle is in this preliminary switch-off mode and detects the portable apparatus (i.e., the portable apparatus is located within the wireless range of the vehicle), the function can be activated wirelessly (i.e., via a corresponding radio command of the portable apparatus). As soon as the vehicle can no longer set up a communication connection to the portable apparatus (i.e., the portable apparatus has left the wireless reception range of the vehicle), the vehicle leaves its preliminary switch-off mode and the wireless activation facility of the function is switched off. This continues to apply (i.e., the wireless activation facility of the function remains switched off) even if the portable apparatus is again located within the wireless range of the vehicle.

As a variant of the disclosed embodiment described above, the wireless activation facility of the function can be switched off only if a specific radio command of the portable apparatus is detected in advance by the vehicle.

In this variant, the vehicle is, in a manner of speaking, switched to the preliminary switch-off mode by the reception of the specific wireless command. However, as soon as the portable apparatus moves outside the wireless range of the vehicle, the vehicle leaves its preliminary switch-off mode and switches the wireless activation facility off, as described above.

According to a further disclosed embodiment, the wireless activation facility of the function is switched off only for a predefined time period. After this predefined time period, the function can again be activated wirelessly. The predefined time span may, for example, be configured by the user of the vehicle. Furthermore, it is also conceivable to specify a minimum time period and a maximum time period, whereby limits can be specified within which the user can choose the time period.

This further disclosed embodiment can be combined with all previously described possibilities for switching off the wireless activation facility. This disclosed embodiment offers the benefit that the activation facility of the function does not have to be switched on again manually, since the activation facility is switched on automatically at the end of the predefined time period.

This further disclosed embodiment can be combined with some of the previously described embodiments to produce the following variants:

For example, the predefined time period begins to run only when a specific wireless command from the portable apparatus is received by the vehicle. In this variant, the specific wireless command from the portable apparatus switches off the wireless activation facility of the function, wherein the activation facility is then switched on again automatically at the end of the predefined time period. In this variant, if the portable apparatus is still located within the wireless reception range of the vehicle when the time period elapses, the running of the time period can be restarted if the specific wireless command is retransmitted by the portable apparatus and is received by the vehicle.

For example, the predefined time period can begin to run only when the portable apparatus moves out of the wireless reception range of the vehicle. In this variant, the vehicle is in the previously described preliminary switch-off mode. If the vehicle can no longer set up a communication connection to the portable apparatus (i.e., the portable apparatus has left the wireless reception range of the vehicle), the vehicle leaves this preliminary switch-off mode and switches the activation facility of the function off, the facility then being switched on again after the predefined time period has elapsed.

A combination of the previously described variants is also possible. The vehicle is switched to the preliminary switch-off mode by means of a specific wireless command from the portable apparatus. As soon as the portable apparatus moves out of the wireless reception range of the vehicle, the vehicle leaves this preliminary switch-off mode and switches the activation facility of the function off, the facility then being switched on again after the predefined time period has elapsed.

With the portable apparatus, it is possible to signal that the wireless activation facility of the function is switched off.

With this disclosed embodiment, the user is informed via the portable apparatus that the wireless activation of the function is, at least temporarily, not possible.

Disclosed embodiments provide a vehicle which comprises wireless means. The wireless means are designed to receive a wireless command from a portable apparatus (e.g., a wireless key or Smartphone). The vehicle is designed to activate a function of the vehicle if, on the one hand, the wireless command is detected and if, on the other hand, the wireless activation facility of the function is not switched off.

The disclosed vehicle differs from a vehicle according to the prior art in that, in the disclosed vehicle, the wireless activation facility of the function(s) can be switched off and can also be switched on.

The benefits of the disclosed vehicle essentially correspond to the benefits of the disclosed method, which are set out in detail above, so that no repetition is required here.

Finally, disclosed embodiments provide a system which comprises a portable apparatus and a vehicle. The portable apparatus comprises wireless means for transmitting a wireless command to the vehicle. The vehicle comprises wireless means for receiving the wireless command from the portable apparatus. The vehicle is designed to activate a function of the vehicle depending on the wireless command, if a wireless activation facility of the function is not switched off.

The benefits of the disclosed system also essentially correspond to the benefits of the disclosed method, which are set out in detail above, so that no repetition is required here.

According to at least one disclosed embodiment, the portable apparatus comprises signaling means for signaling that the wireless activation facility of the function is switched off.

If the portable apparatus transmits its wireless command to the vehicle to activate the function and the vehicle recognizes that it cannot activate the function on the basis of the wireless command since the wireless activation facility of this function is switched off, the vehicle can send a corresponding negative confirmation back to the portable apparatus. Using its signaling means, which may be of an optical, acoustic or haptic type, the portable apparatus signals to the user that the wireless activation facility of the function is, at least temporarily, switched off in the vehicle.

The disclosed embodiments are suitable for motor vehicles. The disclosed embodiments are obviously not limited to this field of application, since the disclosed embodiments are also usable in ships, aircraft and track-bound or rail-guided vehicles. Even use with stationary objects is conceivable (e.g., when opening a door of a building).

FIG. 1 shows schematically a vehicle 10 which comprises an apparatus 20. This apparatus 20 for its part comprises a wireless receiver 1 and a controller 2. In addition, FIG. 1 shows a portable apparatus 30 which comprises an actuation element 3, a wireless transmitter 4 and an LED 5. The apparatus 20 of the vehicle 10 and the portable apparatus 30 form a system 40.

If the user of the portable apparatus 30 for activating a function of the vehicle 10 actuates the actuation element 3 of the portable apparatus 30, the portable apparatus 30 transmits a wireless command to the vehicle 10 via its wireless transmitter 4. This wireless command is detected by the wireless receiver 1 of the apparatus 20 or the vehicle 10 and is evaluated by the controller 2. The controller 2 checks whether the wireless activation facility of the function is switched on or switched off. If the activation facility of the function is switched on, the controller 2 activates the function of the vehicle 10. Conversely, if the wireless activation facility of the function is switched off, the function is not activated. In this case, the apparatus 20 or the vehicle 10 can send a negative confirmation to the portable apparatus 30. If the apparatus 30 receives this negative confirmation, the user is informed via the LED 5 that the function cannot be activated wirelessly. In this case, the user can, for example, activate the corresponding function manually (without a wireless command) using a mechanical key which is authorized for the vehicle 10.

Figure 2:
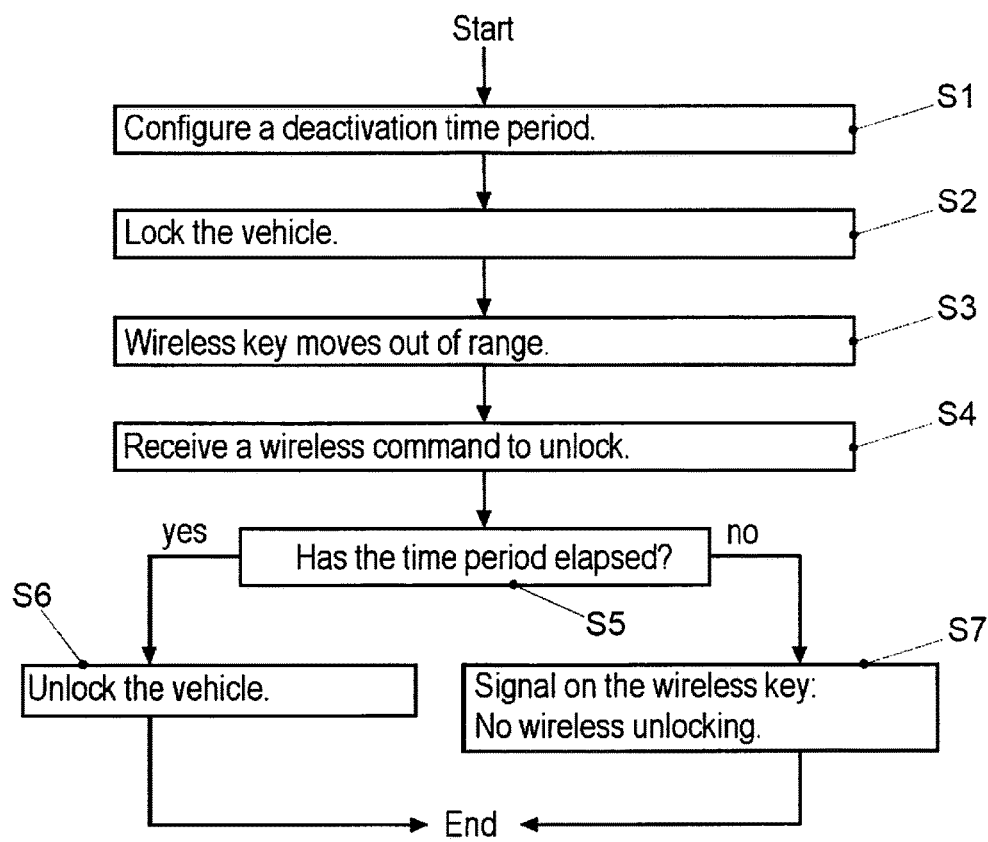
FIG. 2 shows the flow diagram explaining the disclosed embodiments.

FIG. 2 shows a flow diagram to describe the disclosed method.

In operation at S1, a deactivation time period is configured or specified. This deactivation time period defines a time period during which the activation of a specific function of the vehicle via a wireless command is not possible. In operation at S2, the vehicle is locked, and, in operation at S3, the vehicle 10 detects that the wireless key 30 authorized for the vehicle 10 has moved out of the wireless reception range of the vehicle 10. As soon as the vehicle 10 has detected in operation at S3 that the wireless key 30 is no longer within the wireless reception range of the vehicle 10, the vehicle 10 switches the activation facility of the corresponding function off and the deactivation time period begins to run.

If a wireless command to activate the corresponding function (in the present example the unlocking of the vehicle 10) is then detected in operation at S4, a check is carried out in operation at S5 to determine whether the corresponding function can be activated wirelessly, which is the case if the deactivation time period has elapsed in the meantime. If the time period has elapsed in the meantime (i.e., the corresponding function can again be activated wirelessly), the corresponding function is activated (in the present case the vehicle 10 is unlocked in operation at S6). Conversely, if the time period has not yet elapsed (i.e., the wireless activation facility of the corresponding function is still switched off), the function is not activated or performed (the vehicle 10 is not unlocked) and it is signaled in operation at S7 via the wireless key 30 that the function cannot be activated wirelessly.

REFERENCE NUMBER LIST

1 Wireless receiver
2 Controller
3 Actuation element
4 Wireless transmitter
5 LED
10 Vehicle
20 Apparatus
30 Wireless key
40 System
S1-S7 Method operation

The invention claimed is:

1. A method for activating a transportation vehicle function of a transportation vehicle, the method comprising:
transmitting a wireless command to the transportation vehicle from a portable apparatus that is within a wireless reception range of the transportation vehicle;
activating the transportation vehicle function in response to a wireless activation facility of the transportation vehicle function is not switched off,
switching off the wireless activation facility of the transportation vehicle function for a predefined time period in response to detecting that the portable device is moved out of the wireless reception range of the transportation vehicle, and
activating the transportation vehicle function after the time period has elapsed, wherein the time period is configurable.

2. The method of claim 1, wherein the transportation vehicle function comprises at least one transportation vehicle function from a group consisting of:
unlocking a central lock of the transportation vehicle, and
starting a motor of the transportation vehicle.

3. The method of claim 1, wherein an activation facility is configured to be switched off by a user.

4. The method of claim 1, wherein the wireless activation facility of the transportation vehicle function is switched off as soon as a specific wireless command from the portable apparatus is received by the transportation vehicle.

5. The method of claim 1, wherein the switching off of the wireless activation facility of the transportation vehicle function is performed provided that a specific wireless command from the portable apparatus is received in advance by the transportation vehicle.

6. The method of claim 1, further comprising signaling, by the portable apparatus, that the wireless activation facility of the transportation vehicle function is switched off.

7. A transportation vehicle comprising wireless component that receives a wireless command from a portable apparatus that is within a wireless reception range of the transportation vehicle, wherein the transportation vehicle activates a transportation vehicle function of the transportation vehicle in response to receiving the wireless command indicative of a wireless activation facility of the transportation vehicle function not switched off, wherein the transportation vehicle switches off the wireless activation facility of the transportation vehicle function for a predefined time period in response to detecting that the portable device is moved out of the wireless reception range of the transportation vehicle, and wherein the transportation vehicle activates the transportation vehicle function after the time period has elapsed, wherein the time period is configurable.

8. The transportation vehicle of claim 7, wherein the transportation vehicle function comprises at least one transportation vehicle function from a group consisting of:
unlocking a central lock of the transportation vehicle, and
starting a motor of the transportation vehicle.

9. The transportation vehicle of claim 7, wherein an activation facility is configured to be switched off by a user.

10. The transportation vehicle of claim 7, wherein the wireless activation facility of the transportation vehicle function is switched off as soon as the portable apparatus moves from the wireless reception range of the transportation vehicle.

11. The transportation vehicle of claim 10, wherein the transportation vehicle performs to switch off the wireless activation facility of the transportation vehicle function provided that a specific wireless command from the portable apparatus is received in advance by the transportation vehicle.

12. The transportation vehicle of claim 7, wherein the portable apparatus signals in response to the wireless activation facility of the transportation vehicle function is switched off.

13. A system comprising:
a portable apparatus comprises a wireless transmitting component for transmitting a wireless command; and
a transportation vehicle,
wherein the transportation vehicle comprises wireless component for receiving the wireless command that is within a wireless reception range of the transportation vehicle,
wherein the transportation vehicle is configured to activate a transportation vehicle function of the transportation vehicle in response to a receipt of the wireless command indicative of a wireless activation facility of the transportation vehicle function is not switched off,
wherein the transportation vehicle is configured to switch off the wireless activation facility of the transportation vehicle function for a predefined time period in response to detecting that the portable device is moved out of the wireless reception range of the transportation vehicle, and wherein the transportation vehicle is configured to activate the transportation vehicle function after the time period has elapsed, wherein the time period is configurable.

14. The system of claim 13, wherein the portable apparatus comprises a signaling component for signaling that the wireless activation facility of the transportation vehicle function is switched off.

15. The system of claim 13, wherein the transportation vehicle function comprises at least one transportation vehicle function from a group consisting of:

unlocking a central lock of the transportation vehicle, and
starting a motor of the transportation vehicle.

16. The system of claim 13, wherein an activation facility is configured to be switched off by a user.

17. The system of claim 13, wherein the wireless activation facility of the transportation vehicle function is switched off as soon as the portable apparatus moves from the wireless reception range of the transportation vehicle.

18. The system of claim 13, wherein the switch off of the wireless activation facility of the transportation vehicle function is performed provided that a specific wireless command from the portable apparatus is received in advance by the transportation vehicle.

19. The system of claim 13, further comprising signaling, by the portable apparatus, that the wireless activation facility of the transportation vehicle function is switched off.

* * * * *